(12) United States Patent
Hoard et al.

(10) Patent No.: US 7,454,895 B2
(45) Date of Patent: Nov. 25, 2008

(54) DIAGNOSING AN AFTERTREATMENT SYSTEM WITH A NONTHERMAL PLASMA DISCHARGE DEVICE COUPLED TO A LEAN BURN ENGINE

(75) Inventors: John W. Hoard, Livonia, MI (US); Gopichandra Surnilla, West Bloomfield, MI (US); David K. Bidner, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 477 days.

(21) Appl. No.: 10/804,347

(22) Filed: Mar. 19, 2004

(65) Prior Publication Data

US 2005/0204725 A1    Sep. 22, 2005

(51) Int. Cl.
*F01N 3/00* (2006.01)
(52) U.S. Cl. .............. 60/277; 60/274; 60/275; 60/286; 60/301
(58) Field of Classification Search ............ 60/274, 60/275, 276, 277, 301, 286
See application file for complete search history.

(56) References Cited

U.S. PATENT DOCUMENTS 5,970,706 A * 10/1999 Williamson et al. ........... 60/275
6,038,853 A    3/2000 Penetrante et al.
6,363,714 B1 * 4/2002 Hoard et al. ............ 60/275
6,363,716 B1 * 4/2002 Balko et al. ............. 60/274
6,532,733 B1 * 3/2003 Tamura et al. ........... 60/275
7,043,902 B2 * 5/2006 Nakanishi et al. ........ 60/286
2004/0093853 A1 * 5/2004 Hemingway et al. ...... 60/275

* cited by examiner

*Primary Examiner*—Thomas E Denion
*Assistant Examiner*—Diem Tran
(74) *Attorney, Agent, or Firm*—Julia Voutyras; Brooks Kushman P.C.

(57) ABSTRACT

The invention is a method for diagnosing operation of a nonthermal plasma discharge device and a lean NOx trap disposed in the exhaust of an internal combustion engine. The method further includes reducing power to the nonthermal plasma discharge device and determining that the nonthermal plasma discharge device is operating properly when a concentration of NOx of exhaust gases exiting the lean NOx trap increases in response to reducing power to the nonthermal plasma discharge device. Additionally, the nonthermal plasma discharge device is found not to be operating when the NOx concentration remains substantially constant in response to a decrease in power supplied to the nonthermal plasma discharge device.

22 Claims, 5 Drawing Sheets

DIAGNOSING AN AFTERTREATMENT SYSTEM WITH A NONTHERMAL PLASMA DISCHARGE DEVICE COUPLED TO A LEAN BURN ENGINE

FIELD OF INVENTION

The present invention relates to an aftertreatment system for treating exhaust gases from a lean burn engine and, more particularly, to an aftertreatment system comprising a nonthermal plasma discharge device.

BACKGROUND OF THE INVENTION

It is well known by those skilled in the art that internal combustion engines burning a lean mixture of fuel and air consume significantly less fuel than when operating at a stoichiometric mixture of air and fuel. Presently, there are very few lean burn gasoline engines in production due to difficulties in meeting emission requirements. The difficulty is that conventional precious metal catalyst oxidizes CO and hydrocarbons and reduces NOx at high efficiency when the air-fuel mixture is very close to stoichiometric; but, NOx conversion efficiency drops off substantially when the exhaust gases are lean.

It is known in the art to use a lean NOx trap (LNT) aftertreatment system for processing the products of lean combustion. During lean combustion, NOx is trapped in the LNT. When the LNT is full, the engine is operated rich for a short period of time. The rich exhaust gases cause the absorbed NOx to desorb from catalyst surfaces. Furthermore, the rich exhaust gases contain CO and unburned hydrocarbons that reduce NOx to N2. Although commonly called a lean NOx trap, the LNT actually stores only NO2 to a high degree. Because NOx coming from the engine is predominantly comprised of NO and very little NO2, an oxidation catalyst is provided upstream to cause NO to oxidize to NO2.

The inventors of the present invention have recognized a difficulty in relying on an oxidation catalyst to perform the oxidation of NO to NO2. Specifically, the oxidation catalyst is only partially active below a temperature of about 200° C. Thus, during warm up or at very low power conditions, the reaction from NO to NO2 is marginal. Consequently, NO proceeds through the LNT and out the vehicle tailpipe unprocessed.

A known problem with lean NOx traps is their susceptibility to SOx contamination. Most hydrocarbon fuels contain some sulfur. The sulfur oxidizes mostly to SO2 during the combustion process in the combustion chamber. If an oxidation catalyst is placed upstream of the LNT, the SO2 is further oxidized to SO3. SO2 can pass through the exhaust system with no harmful effect. However, SO3, in the presence of water vapor in the exhaust, forms particulates containing sulfuric acid. These become absorbed in the LNT and reduce its conversion efficiency. To overcome sulfur degradation of LNT performance, it is known to periodically regenerate the trap, commonly called deSOx. The SOx can be desorbed and made to exit the LNT when its temperature is raised to a high temperature, in the range of 700-800° C., for a period of time, typically greater than a minute. The inventors of the present invention have recognized several problems with sulfur contamination: first, the LNT operates at less than its optimal efficiency for much of the time due to the sulfur contamination and secondly, the deSOx operation is cumbersome, penalizes fuel economy, and the deSOx temperature is near the temperature at which permanent damage to the LNT occurs making control of deSOx regeneration a challenge.

Furthermore, deSOx regeneration is not completely reversible. The propensity of an oxidation catalyst to oxidize SO2 to SO3 is harmful to the LNT. Some LNTs contain precious metals, such as platinum, in their formulation. In such LNTs, the oxidation of SO2 to SO3 happens regardless of whether there is an oxidation catalyst upstream or not.

The inventors of the present invention have further recognized that it is desirable to provide any aftertreatment system with an onboard diagnostic procedure to detect system deficiencies.

SUMMARY OF THE INVENTION

To overcome disadvantages in the prior systems, the inventors of the present invention have recognized that a nonthermal plasma discharge device can be used to convert NO to NO2 in place of an oxidation catalyst.

Disclosed is a method for diagnosing operation of a nonthermal plasma discharge device and a lean NOx trap disposed in the exhaust of an internal combustion engine. The method includes reducing power to the nonthermal plasma discharge device and determining that the nonthermal plasma discharge device is operating properly when a concentration of NOx of exhaust gases exiting the lean NOx trap increases in response to reducing power to the nonthermal plasma discharge device. Additionally, the nonthermal plasma discharge device is determined to not be operating when the NOx concentration remains substantially constant in response to a decrease in power supplied to the nonthermal plasma discharge device.

Also disclosed is method for diagnosing operation of a nonthermal plasma device similar to that discussed above, except that instead of power to the nonthermal discharge device being reduced, it is fuel supply to the nonthermal discharge device which is reduced for diagnostic purposes.

An advantage of the present invention is in providing information about deterioration of the exhaust aftertreatment system.

Other advantages, as well as objects and features of the present invention, will become apparent from the following detailed description of the preferred embodiments when taken in connection with the accompanying drawings.

DETAILED DESCRIPTION

Figure 1:
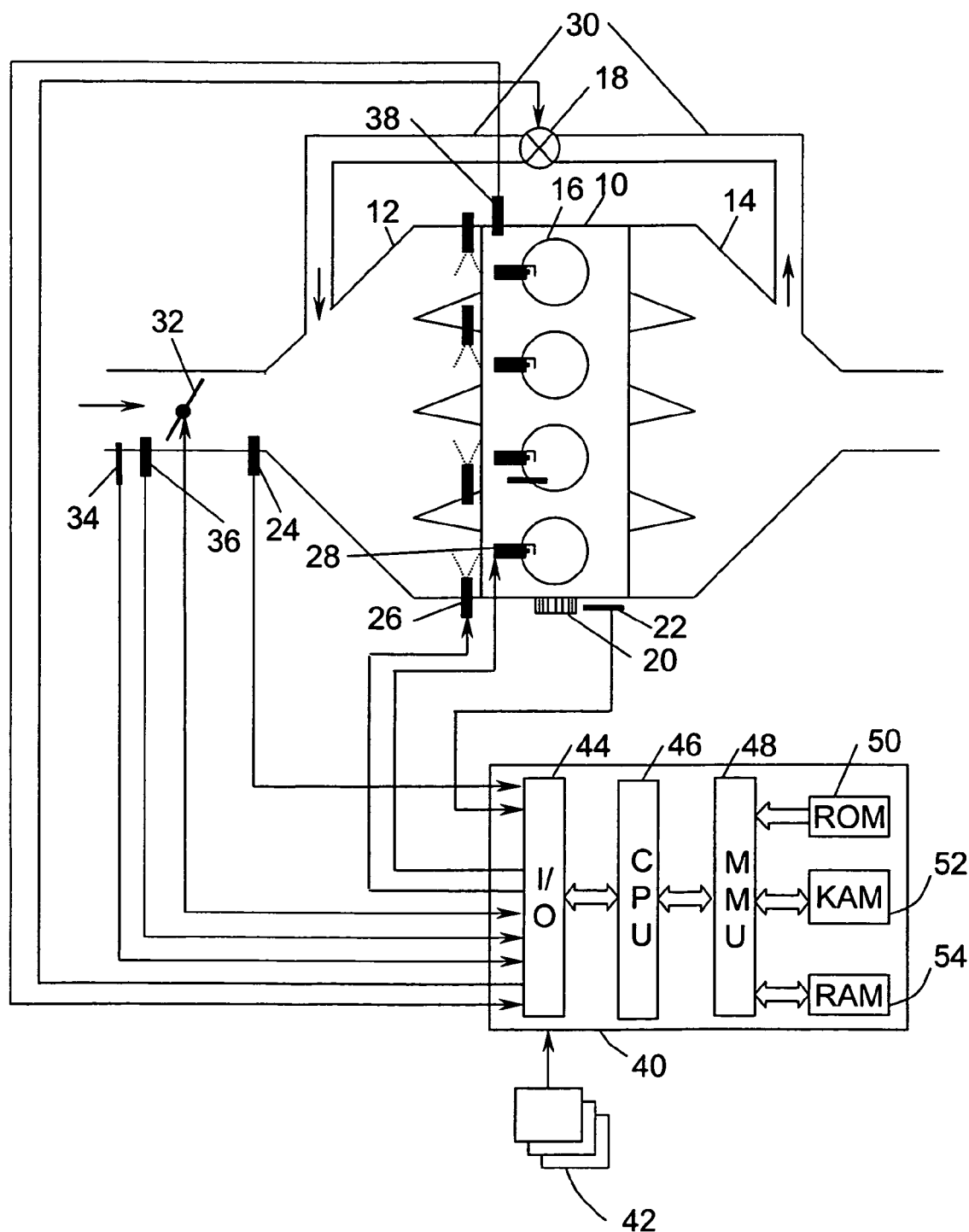
FIG. 1 shows a schematic of a typical gasoline engine.

A 4-cylinder internal combustion engine 10 is shown, by way of example, in FIG. 1. Engine 10 is supplied air through intake manifold 12 and discharges exhaust gases through exhaust manifold 14. An intake duct upstream of the intake manifold 12 contains a throttle valve 32 which, when actuated, controls the amount of airflow to engine 10. Sensors 34 and 36 installed in intake manifold 12 measure air temperature and mass airflow (MAF), respectively. Sensor 24, located in intake manifold 14 downstream of throttle valve 32, is a manifold absolute pressure (MAP) sensor. A partially closed throttle valve 32 causes a pressure depression in intake manifold 12. When a pressure depression exists in intake manifold 12, exhaust gases are caused to flow through exhaust gas recirculation (EGR) duct 30, which connects exhaust manifold 14 to intake manifold 12. Within EGR duct 30 is EGR valve 18, which is actuated to control EGR flow. Fuel is supplied to engine 10 by fuel injectors 26. Each cylinder 16 of engine 10 contains a spark plug 26. The crankshaft (not shown) of engine 10 is coupled to a toothed wheel 20. Sensor 22, placed proximately to toothed wheel 20, detects engine 10 rotation.

Engine 10 is described as a spark-ignition engine. However, the present invention applies also to a compression-ignition type engine, which could be a homogeneous-charge, compression-ignition or diesel engine Continuing to refer to FIG. 1, electronic control unit (ECU) 40 is provided to control engine 10. ECU 40 has a microprocessor 46, called a central processing unit (CPU), in communication with memory management unit (MMU) 48. MMU 48 controls the movement of data among the various computer readable storage media and communicates data to and from CPU 46. The computer readable storage media preferably include volatile and nonvolatile storage in read-only memory (ROM) 50, random-access memory (RAM) 54, and keep-alive memory (KAM) 52, for example. KAM 52 may be used to store various operating variables while CPU 46 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 46 in controlling the engine or vehicle into which the engine is mounted. The computer-readable storage media may also include floppy disks, CD-ROMs, hard disks, and the like. CPU 46 communicates with various sensors and actuators via an input/output (I/O) interface 44. Examples of items that are actuated under control by CPU 46, through I/O interface 44, are fuel injection timing, fuel injection rate, fuel injection duration, throttle valve 32 position, spark plug 26 timing, and EGR valve 18. Various other sensors 42 and specific sensors (engine speed sensor 22, engine coolant sensor 38, manifold absolute pressure sensor 24, air temperature sensor 34, and mass airflow sensor 36) communicate input through I/O interface 44 and may indicate engine rotational speed, vehicle speed, coolant temperature, manifold pressure, pedal position, cylinder pressure, throttle valve position, air temperature, exhaust temperature, exhaust stoichiometry, exhaust component concentration, and air flow. Some ECU 40 architectures do not contain MMU 48. If no MMU 48 is employed, CPU 46 manages data and connects directly to ROM 50, RAM 54, and KAM 52. Of course, the present invention could utilize more than one CPU 46 to provide engine control and ECU 40 may contain multiple ROM 50, RAM 54, and KAM 52 coupled to MMU 48 or CPU 46 depending upon the particular application.

Figure 2:
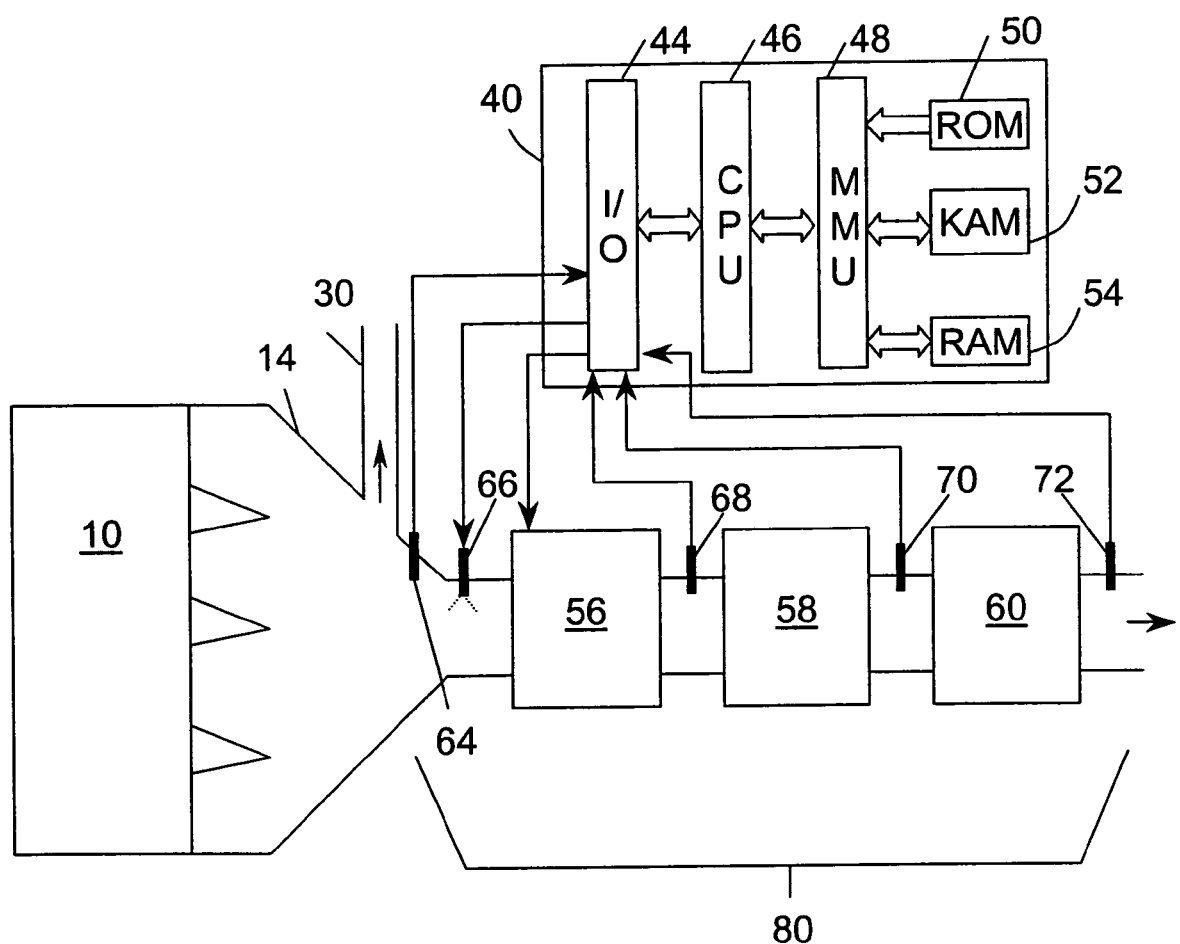
FIG. 2 shows a schematic of the exhaust aftertreatment system of the engine shown in FIG. 1.

The exhaust aftertreatment system 80 coupled to engine 10 is shown in FIG. 2. A nonthermal plasma discharge device (NPDD) 56 is located downstream of the exhaust manifold 14. Downstream of NPDD 56 is a lean NOx trap (LNT) 58. Downstream of LNT 58 is a catalyst containing precious metals on its internal surfaces. NPDD 56 converts NO to NO2, but does so at higher efficiency in the presence of hydrocarbon materials. Thus, preferably, an injector 66 is placed upstream of NPDD 56 supplying fuel or another hydrocarbon. Alternatively, engine 10 is a direct injection engine in which fuel injectors 26 provide fuel into cylinders 16. In a DI engine, fuel can be supplied to NPDD 56 by injecting after the combustion has occurred in the cylinder and before the exhaust valve closes. Thus, excess fuel is supplied at a time in the cycle in which significant oxidation of the fuel does not occur. In another alternative, the combustion process in the cylinder can be specifically tailored to provide some excess hydrocarbons into the exhaust gases, eg., by fuel stratification. In yet another alternative, a fuel injection pulse from a port fuel injector 26, as shown in FIG. 1, can be caused to occur during valve overlap, i.e., when both intake and exhaust valves are open, allowing fuel to travel through cylinders 16 without being combusted.

Continuing to refer to FIG. 2, exhaust aftertreatment system 80 comprises exhaust gas sensors. Sensors 64, 68, 70, and 72 are exhaust gas oxygen (EGO) sensors. Alternatively, sensors 64, 68, 70, and 72 are NOx sensors. In a further alternative, there are EGO and NOx sensors located at each of 64, 68, 70, and 72. Sensors 64, 68, 70, and 72 provide signals to I/O 44 of ECU 40. A signal from ECU 40 controls fuel injector 66.

It is well known to those skilled in the art that LNT 58 traps primarily NO2. A typical exhaust gas composition has a NO2/(NO+NO2) ratio significantly less than 10%. Thus, if raw exhaust gases were fed to LNT 58, only a small fraction of the NOx, i.e., the NO2 portion, would be stored within LNT 58. In the exhaust aftertreatment system 80 shown in FIG. 2, NPDD 56 is placed upstream of LNT 58 to convert NO to NO2. Within NPDD 56, an electrical discharge, in the presence of a small concentration of hydrocarbons causes NO to oxidize to NO2. The exhaust stream, in which the NO has been converted to NO2, is conducted to LNT 58, in which the NO2 is trapped. This continues until LNT 58 no longer can store more NO2, at which point, LNT 58 is purged by causing the air-fuel ratio in the exhaust to become rich. Rich exhaust gases cause the NO2 to desorb from LNT 58. Thus, a purge is initiated by operating engine 10 at a rich air-fuel ratio. Alternatively, fuel can be added to exhaust gases to cause the overall stoichiometry to be rich.

Precious metal catalyst 60, located downstream of LNT 58, has two functions. It oxidizes hydrocarbons, aldehydes, and CO during lean and rich operation. During rich operation, stored oxygen in NO2 serves as the oxidant, decomposing or reacting with reductants into N2 and O2. During stoichiometric operation, catalyst 60 also reduces NOx.

The efficiency at which NPDD 56 converts NO to NO2 is affected primarily by two variables: the amount of electrical energy supplied to the NPDD, $P_{elec}$, and the amount of hydrocarbons supplied, $m_{f,\,inj}$:

$$\eta_{conv} = \text{function}\,(P_{elec},\,m_{f,\,inj}) \qquad (1)$$

Both $P_{elec}$ and $m_{f,\,inj}$ penalize system fuel economy. The desired conversion efficiency can be achieved while minimizing fuel economy penalty. The amount of fuel energy consumed in providing the electrical power to drive the NPDD 56 can be determined from:

$$P_{elec} = (m_{f,\,eq} * \Delta H_R)/\eta_{overall}$$

where $m_{f,\,eq}$ is the equivalent fuel consumed in providing electrical energy to the NPDD 56, $\Delta H_R$ is the enthalpy of reaction of fuel, and $\eta_{overall}$ is the overall efficiency of the engine in converting the fuel's chemical energy into electrical energy and providing that to the NPDD 56. The value of $\eta_{overall}$ is a function of engine operating conditions and is so computed. Alternatively, a constant value of $\eta_{overall}$ is used if the magnitude of the range in $\eta_{overall}$ over the engine operating map is inconsequential. The total effective fuel consumed in the NPDD 56 is:

$$m_{f,tot} = \eta_{overall} * P_{elec} * \Delta H_R + m_{f,inj}. \quad (2)$$

Equation 1 above is solved with the additional constraint that $m_{f,tot}$ according to equation 2, is minimized. In the above discussion, the hydrocarbon supply is defined as fuel. If the hydrocarbon supply is other than fuel, the above equations apply, except that $\Delta H_R$ is the enthalpy of reaction of the fluid being supplied.

Figure 3:
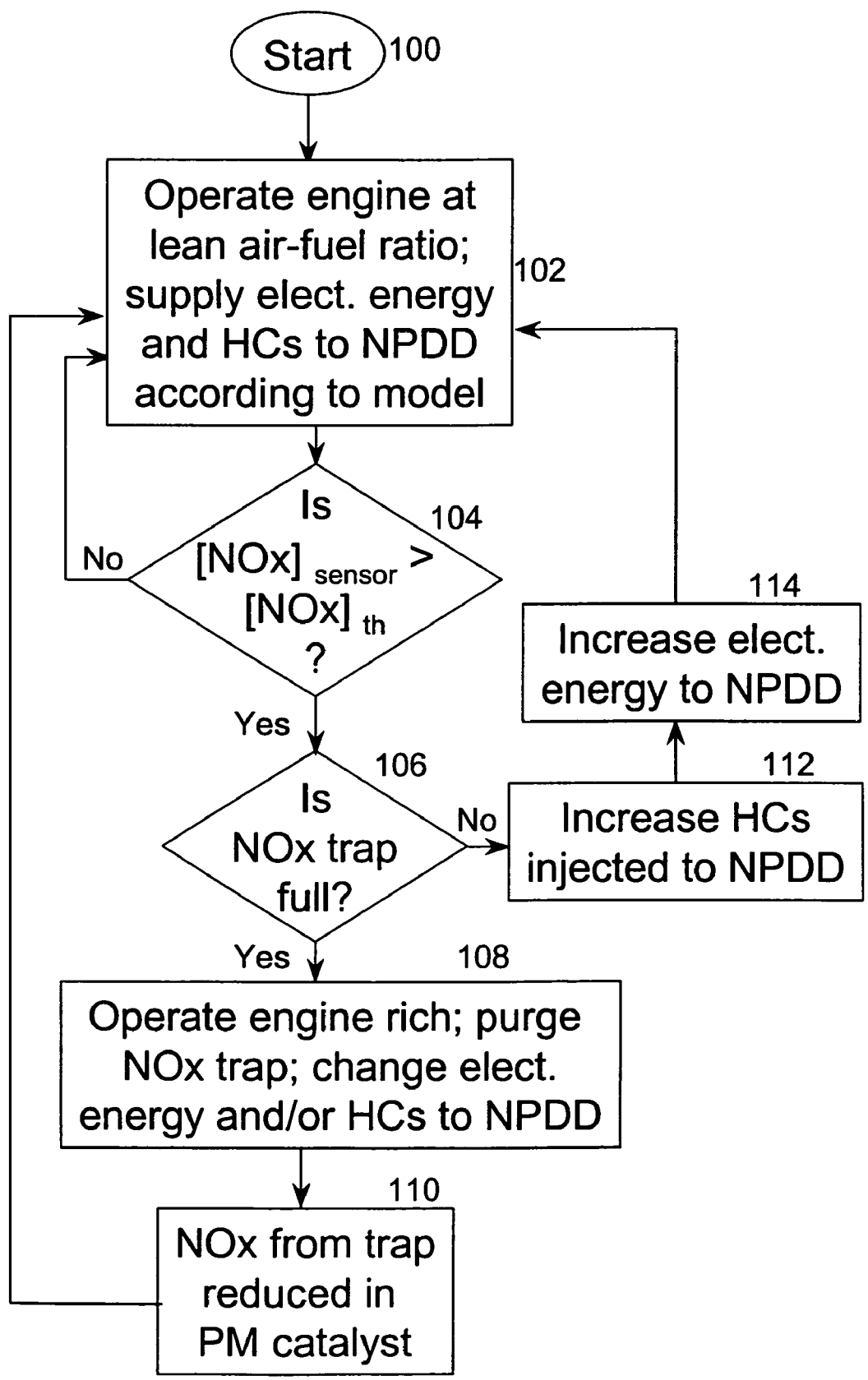
FIG. 3 is a flowchart showing a method of operating an engine and aftertreatment system according to an aspect of the present invention.

Referring now to FIG. 3, a routine for operating engine 10 starts in step 100. In step 102, the engine is operated at a lean air-fuel ratio. In step 104 it is determined whether [NOx] at the sensor is greater than a [NOx]$_{threshold}$. Preferably, [NOx]$_{threshold}$ is determined as a function of engine operating condition. If the threshold is exceeded, it is determined whether the NOx trap is likely to be full. If full, control passes to step 108 in which a purge cycle is accomplished by causing the engine air-fuel ratio to be rich. At the same time, the amount of electrical energy, $P_{elec}$, and the amount of hydrocarbons, $m_{f,inj}$ supplied to NPDD 56 are altered. Preferably, these are curtailed to save energy during the purge. Alternatively, $P_{elec}$ and $m_{f,inj}$ are operated at a different level than during trapping. The NOx exiting LNT 58 is conducted into PM catalyst 60, in which NOx is reacted to N2 and O2, step 110. If in step 106 it is determined that LNT 58 is not full, one or both of steps 112 and 114 occur: increasing P and increasing $m_{f,inj}$ to NPDD 56. Both steps 112 and 114 are shown as consequences of a negative result from step 106. Alternatively, one of steps 112 and 114 can be accomplished. Then, in step 104, it is determined whether the action taken in step 112 or 114 caused a decrease in [NOx] below the threshold level. If not, the other of steps 112 and 114 is caused to occur.

According to another embodiment of the present invention, the loop in FIG. 3, comprising steps 102, 104, 106, 112, and 114, can be used to update the constants in the operating model of NPDD 56, according to equation 1. In yet a further embodiment of the present invention, accessing steps 112 and 114 in FIG. 3 indicates that the system is not providing the expected conversion of NO to NO2 in NPDD 56. As mentioned above, one alternative is to adjust the model. Another alternative is to access a system diagnostic routine when steps 112 and 114 are repeatedly accessed with limited improvement in NO conversion efficiency in NPDD 56.

Figure 4:
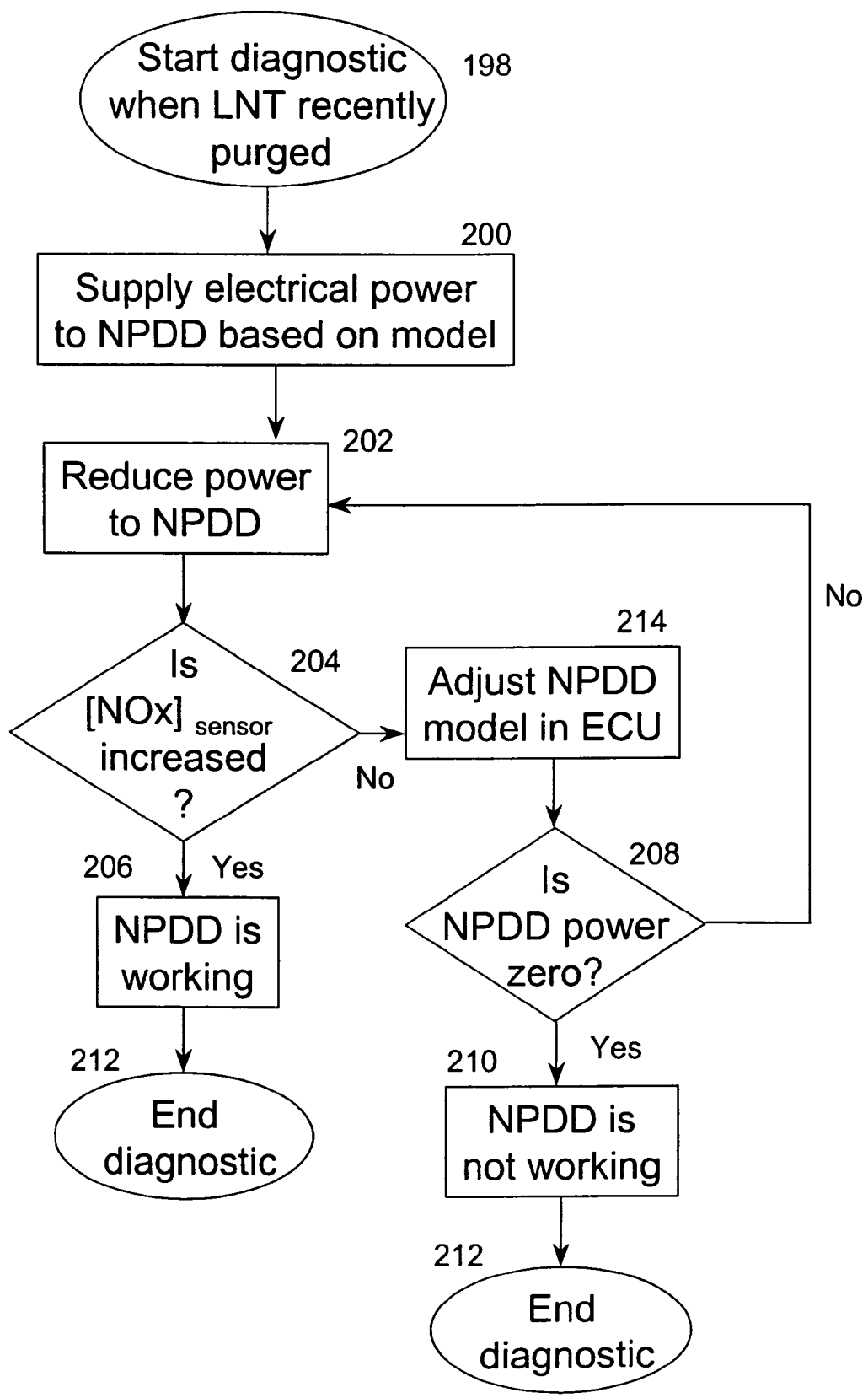
FIGS. 4 and 5 are flowcharts showing diagnostic procedures to determine operational activity of the nonthermal plasma discharge device according to an aspect of the present invention.

A diagnostic routine for NPDD 56 is shown in FIG. 4. Beginning in step 198, the diagnostic routine is initiated. The diagnostic routine is begun only when the LNT has been recently purged. That is, operation of the diagnostic routine is undertaken at a time when a high level of NOx at NOx sensor 70 would signify a problem with NPDD 56 converting NO to NO2, not a problem with LNT being unable to trap NO2. If the starting condition is met, power supply to NPDD 56 is that determined from an engine model of NPDD 56 performance. Based on the present engine operating condition, the model provides an expectation for electrical power and fuel to be supplied to NPDD 56. Alternatively, a lookup table based on engine operating conditions is used to determine electrical power and fuel to supply to NPDD 56. Power to NPDD 56 is reduced in step 202. In step 204, it is determined whether the NOx concentration at sensor 70 has increased. If there has been an increase in NOx concentration, it is determined that NPDD 56 is working, step 206. The diagnostic is ended in step 212. If the result from step 204 is negative, that is NOx concentration has not changed in response to a change in power to NPDD 56, the model is adjusted in step 214. Next, it is determined in step 208 whether NPDD 56 power is zero. If so, control passes to step 210 in which it is registered that NPDD 56 is not working. If a negative result from step 208, control passes to step 202 to further reduce NPDD 56 power. The power is progressively reduced until NPDD 56 power is turned off The purpose of progressively lowering power to NPDD 56, as shown in the loop of steps 202, 204, and 208, is to ensure that NPDD 210 is truly not working. In one scenario, if the power to NPDD 56 is higher than need be, then dropping the power does not result in a measurable difference in NOx concentration at the exit of LNT 58. Thus, to obtain an accurate determination of NOx concentration this possible scenario is ruled out by steps 202, 204, and 208.

An alternative to the diagnostic method of FIG. 4 is to instead turn off power to NPDD 56 in step 202, i.e., turn it off completely rather than progressively reduce NPDD 56 power. Steps 208 and 214 are unnecessary in the alternative. If a negative result is returned from step 204, control passes directly to step 210. The difference between FIG. 4 and the alternative to FIG. 4 is that by turning off NPDD 56 completely, the NO to NO2 conversion is completely turned off. During even a short interval in which NO is not converted to NO2, NO breaks through exhaust aftertreatment system 80 leading to a momentary increase in exhaust emissions. By reducing the power to NPDD 56 according to the diagnostic method shown in FIG. 4, NO to NO2 conversion is lessened but not completely stopped. The emission impact of the FIG. 4 diagnostic is less than the alternative method.

Figure 5:
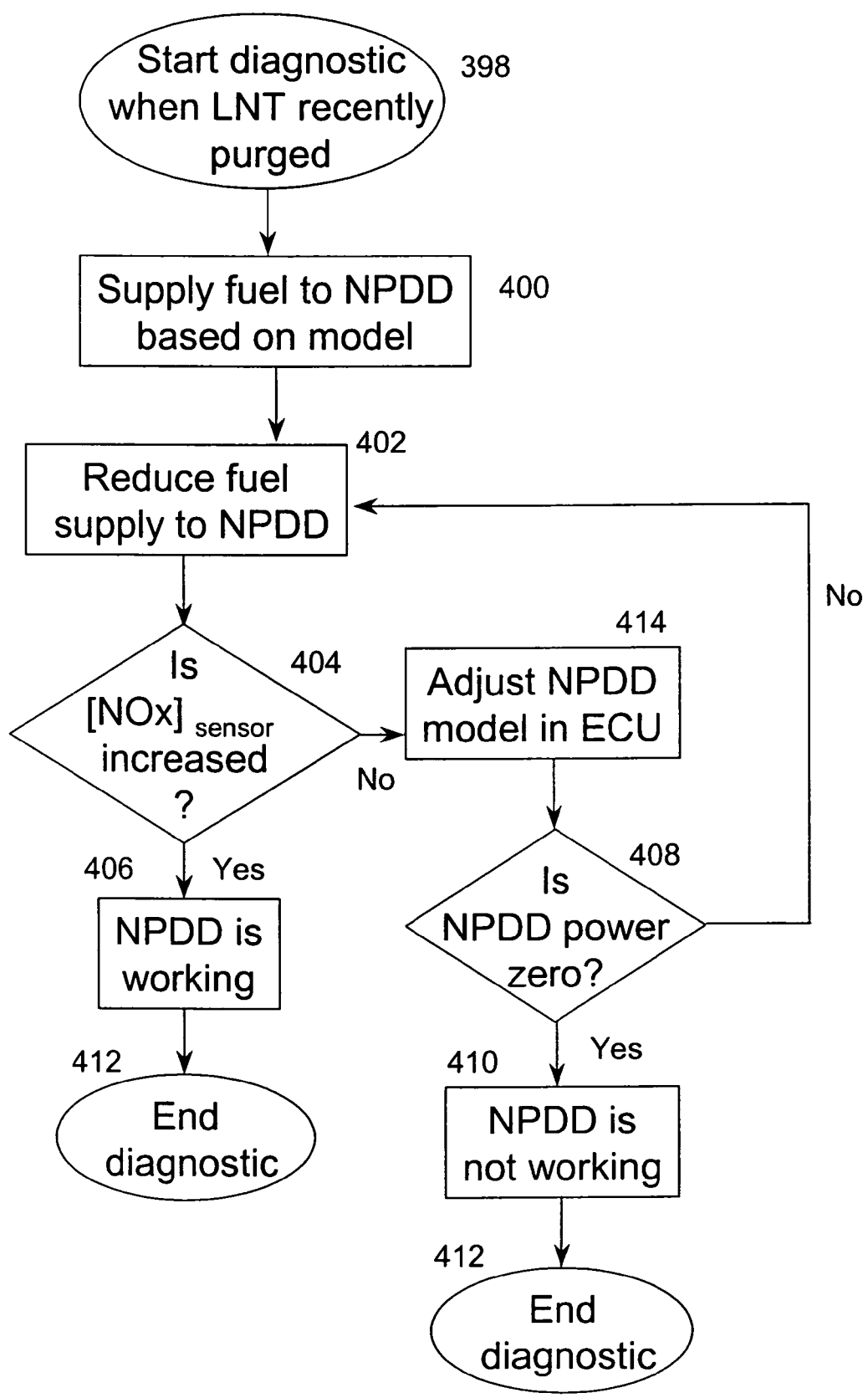

An alternative diagnostic strategy in which fuel supply is reduced is shown in FIG. 5. The steps are analogous to those in FIG. 4, expect that it refers to fuel supply to NPDD 56.

While several modes for carrying out the invention have been described in detail, those familiar with the art to which this invention relates will recognize alternative designs and embodiments for practicing the invention. Thus, the above-described embodiments are intended to be illustrative of the invention, which may be modified within the scope of the following claims.

We claim:

1. A method for diagnosing operation of a nonthermal plasma discharge device disposed in the exhaust of an internal combustion engine, comprising:
   reducing power to the nonthermal plasma discharge device to initiate diagnosis of the nonthermal plasma discharge device wherein said engine exhaust has a lean NOx trap disposed downstream of the nonthermal plasma discharge device and substantially all gases coming to said lean NOx trap have previously passed through said nonthermal plasma discharge device; and
   determining that said nonthermal plasma discharge device is operating properly when a concentration of NOx of exhaust gases exiting said lean NOx trap increases in response to reducing power to the nonthermal plasma discharge device.

2. The method of claim 1 wherein said diagnostic procedure is conducted shortly following a purge cycle of said lean NOx trap.

3. The method of claim 1 wherein said concentration of NOx is detected by a NOx sensor located in the engine exhaust downstream of said lean NOx trap.

4. The method of claim 1, further comprising:
   decreasing power to said nonthermal plasma discharge device when a concentration of NOx of exhaust gases exiting said lean NOx trap remains substantially constant in response to reducing power to the nonthermal plasma discharge device.

5. The method of claim 4, further comprising
determining that said nonthermal plasma discharge device is not operating when power supplied to said nonthermal plasma discharge device is nearly zero.

6. The method of claim 1 wherein said power supply to the nonthermal plasma discharge device prior to said reducing power is determined by a nonthermal plasma discharge device operating model.

7. The method of claim 6, further comprising: updating said operating model when said reduction in power to the nonthermal plasma discharge device causes no substantial decrease in NOx concentration of exhaust gases exiting said lean NOx trap.

8. The method of claim 6 wherein said operating model provides a computation of fuel and electrical energy to supply to the nonthermal plasma discharge device based on an engine operating parameter.

9. The method of claim 8 wherein said engine operating parameter comprises at least one of: engine speed, torque, mass airflow, throttle position, air-fuel ratio, air temperature, and engine coolant temperature.

10. A method for diagnosing operation of a nonthermal plasma discharge device, comprising:
reducing fuel supply to the nonthermal plasma discharge device disposed in the exhaust of an internal combustion engine to initiate diagnosis of the nonthermal plasma discharge device wherein said engine exhaust has a lean NOx trap disposed downstream of the nonthermal plasma discharge device; and
determining that said nonthermal plasma discharge device is operating properly when a concentration of NOx of exhaust gases exiting said lean NOx trap increases in response to reducing fuel supply to the nonthermal plasma discharge device,
wherein substantially all exhaust gases exiting said internal combustion engine tailpipe pass through said nonthermal plasma discharge device.

11. The method of claim 10 wherein said diagnostic procedure is conducted shortly following a purge cycle of said lean NOx trap.

12. The method of claim 10 wherein said concentration of NOx is detected by a NOx sensor located in the engine exhaust downstream of said lean NOx trap.

13. The method of claim 10, further comprising:
decreasing fuel supply to said nonthermal plasma discharge device when a concentration of NOx of exhaust gases exiting said lean NOx trap remains substantially constant in response to reducing fuel supply to the nonthermal plasma discharge device.

14. The method of claim 13, further comprising
determining that said nonthermal plasma discharge device is not operating when fuel supplied to said nonthermal plasma discharge device is nearly zero.

15. The method of claim 10 wherein said power supply to the nonthermal plasma discharge device prior to said reducing power is determined by a nonthermal plasma discharge device operating model.

16. The method of claim 15, further comprising: updating said operating model when said reduction in power to the nonthermal plasma discharge device causes no substantial decrease in NOx concentration of exhaust gases exiting said lean NOx trap.

17. The method of claim 15 wherein said operating model provides a computation of fuel and electrical energy to supply to the nonthermal plasma discharge device based on an engine operating parameter.

18. The method of claim 17 wherein said engine operating parameter is based on at least one of: engine speed, torque, mass airflow, throttle position, air-fuel ratio, air temperature, and engine coolant temperature.

19. A system for diagnosing operation of an exhaust aftertreatment system of an internal combustion engine, comprising:
a nonthermal plasma discharge device disposed in the exhaust of the internal combustion engine;
a lean NOx trap disposed in the engine exhaust downstream of said nonthermal plasma discharge device wherein substantially all gases coming to said lean NOx trap pass through said nonthermal plasma discharge device;
a power supply coupled to said nonthermal plasma discharge device;
a fuel injector located upstream of said nonthermal plasma discharge device; and
an electronic control unit electronically coupled to the engine, said power supply, and said fuel injector, said electronic control unit reducing supply of an energy quantity to said nonthermal plasma discharge device to initiate diagnosis of said nonthermal plasma discharge device and determining that said nonthermal plasma discharge device is operating properly when a concentration of NOx of exhaust gases exiting said lean NOx trap increases in response to reducing said energy quantity supply to the nonthermal plasma discharge device.

20. The system of claim 19 wherein said energy quantity is a fuel quantity supplied by said fuel injector.

21. The system of claim 19 where said energy quantity is an electrical energy supplied by said power supply.

22. The system of claim 19 wherein said electronic control unit further determines that said plasma discharge device is not operating properly when a concentration of NOx of exhaust gases exiting said lean NOx trap remains substantially constant in response to reducing said energy quantity supply.

* * * * *